United States Patent [19]

Jones

[11] Patent Number: 4,981,594

[45] Date of Patent: Jan. 1, 1991

[54] WASTE WATER PURIFICATION SYSTEM

[75] Inventor: Randall J. Jones, Phoenix, Ariz.

[73] Assignee: Wastewater Resources Inc., Scottsdale, Ariz.

[21] Appl. No.: 515,064

[22] Filed: Apr. 26, 1990

[51] Int. Cl.$^5$ ................... B01D 61/14; B01D 61/18
[52] U.S. Cl. ................... 210/634; 210/644; 210/195.2; 210/257.2; 210/263; 210/321.6
[58] Field of Search .................. 210/195.2, 257.2, 263, 210/294, 314, 321.6, 321.69, 321.72, 321.64, 634, 641, 644, 649–651, 652

[56] References Cited

U.S. PATENT DOCUMENTS 4,145,279 3/1979 Selby .................. 210/257.2

*Primary Examiner*—Frank Sever
*Attorney, Agent, or Firm*—Antonio R. Durando; Harry M. Weiss

[57] ABSTRACT

A purification system for cooling tower water where no antiscalent chemicals need be added when the water is provided from a municipal source. The water is continually filtered and disinfected, and its TDS is kept at acceptable levels, by the use of nanofiltration in combination with ionization. Water discharge form the tower is reduced by 80 percent or more.

20 Claims, 1 Drawing Sheet

WASTE WATER PURIFICATION SYSTEM

BACKGROUND OF THE INVENTION

1. Field of the Invention

This invention pertains to the general field of water purification. In particular, it provides a new method and apparatus for the continuous treatment and reuse of waste water.

2. Description of the Prior Art

In general, water for domestic as well as industrial use has been the subject of treatment and purification for a long time in order to remove toxic contaminants, bad odors and suspended solids. The water is typically treated by various means of filtration and chemical reaction designed to accomplish specific purification goals, as needed by particular users. The most common systems involve passing the water through layers of filtering media, to remove solid particles, and through chemically active media, to reduce the water's hardness, improve its pH, and extract undesirable contaminants.

Accordingly, water purification agents are generally categorized in terms of their function as filters, when designed to eliminate larger size suspended solids; clarifiers, when intended to remove smaller size particles and reduce opacity; softeners, to remove calcium and magnesium ions and reduce water hardness; and refiners, to extract chlorine, iron and organic compounds. Both anion and cation exchange resins are used to perform a multiplicity of these functions.

The separation of solutes from water by means of selectively permeable membranes is an effective and economical method of water purification. The processes of reverse osmosis, ultrafiltration, nanofiltration and electrodialysis all involve the use of membranes that have the ability to prevent the migration of most dissolved and suspended solids while allowing the passage of water through their pores.

This invention is directed to the use of novel combinations of these known methods of water purification in new applications for treating waste water and similar effluents. In particular, it discloses a new three stage process for reducing total dissolved solids, commonly referred to as TDS, and for disinfecting cooling tower water. This new process is intended to replace the current practice of chemical treatment and periodic disposal of cooling tower water to the sewer system.

During normal cooling tower operation, the water is continuously subject to evaporation by exposure to unsaturated air. During the contact between the two phases, heat is absorbed by evaporating water molecules and released from the liquid. The ensuing heat and mass transfer result in a cooler and more concentrated water phase in the cooling tower. Thus, as water evaporates, the tower water TDS increases from its original level in the influent municipal source and soon reaches concentrations that could result in damaging scaling in the equipment. The problem is further compounded by suspended particles trapped in the water from the air during the very active mass transfer occurring in the cooling process, all of which contributes to a continuous rise in TDS during normal operating conditions.

In order to prevent this scaling problem, antiscalent chemicals are added that allow a higher TDS level in the water without precipitation. Before this higher TDS level is reached, normally at a concentration twice the TDS level of the incoming water, a large portion of the tower water is dumped to the sewer and replenished with fresh water and new antiscalent. Typically as much as 30 percent of the daily water consumption, which also includes evaporation, is due to this periodic blow down. Where particularly hard water exists, this percentage can be as high as 50. The net effect of this operation is a corresponding reduction in TDS, but at the cost of wasted antiscalent additives and great consumption of water. In addition, other chemicals are routinely added to the system to disinfect and reduce algae growth. These chemicals must also be replaced after each water blow down, further adding to the costs of operating a cooling tower under the traditional water treatment methods.

It is the purpose of this invention to address all the problems mentioned above. It has been found that the processes of nanofiltration and reverse osmosis are capable of effectively reducing the total dissolved content in cooling tower water and of keeping it at levels safe for continuous operation. Both processes involve the use of membranes that have the ability to prevent the migration of most dissolved and suspended solids while allowing the passage of water through their pores. Accordingly, the method is used in combination with sand filtration and disinfection to treat cooling tower water in a close circuit, without any need for periodic disposal and replacement of large portions of the tower capacity. In addition, the new process functions efficiently without antiscalent additives. However, since most naturally occurring waters contain substances that can adversely affect the functioning of these membranes by reducing their permeability to water, thus decreasing the efficiency of separation and water throughput, pretreatment of the influent water is always desirable and often necessary.

SUMMARY OF THE INVENTION

This invention describes a purification system for cooling tower water where no antiscalent chemicals need be added when the water is provided from a municipal source. The water is continually filtered and disinfected, and its TDS is kept at acceptable levels by the use of nanofiltration.

One of the objectives of this invention is the reduction of overall consumption of fresh water by minimizing discharges to the drain. This is accomplished by a process that continuously treats all the water in the system while bleeding a relatively small, high TDS stream to disposal in the municipal sewer.

Another objective of the invention is the reduction of the amount of chemicals used to avoid scaling in the apparatus. Since the total TDS is at all times kept below the levels that result in scaling, no antiscalent additives need be used for that purpose in this process.

Yet another objective of the invention is the realization of the above mentioned goals in an economical and commercially viable manner. This is done by utilizing components that are either already available in the open market or can be produced at competitive prices.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawing and examples, fully described in the detailed description of the preferred embodiment and particularly pointed out in the claims. However, such drawing and description disclose but one of the various ways in which the invention may be practiced.

DETAILED DESCRIPTION OF THE INVENTION

Figure 1:
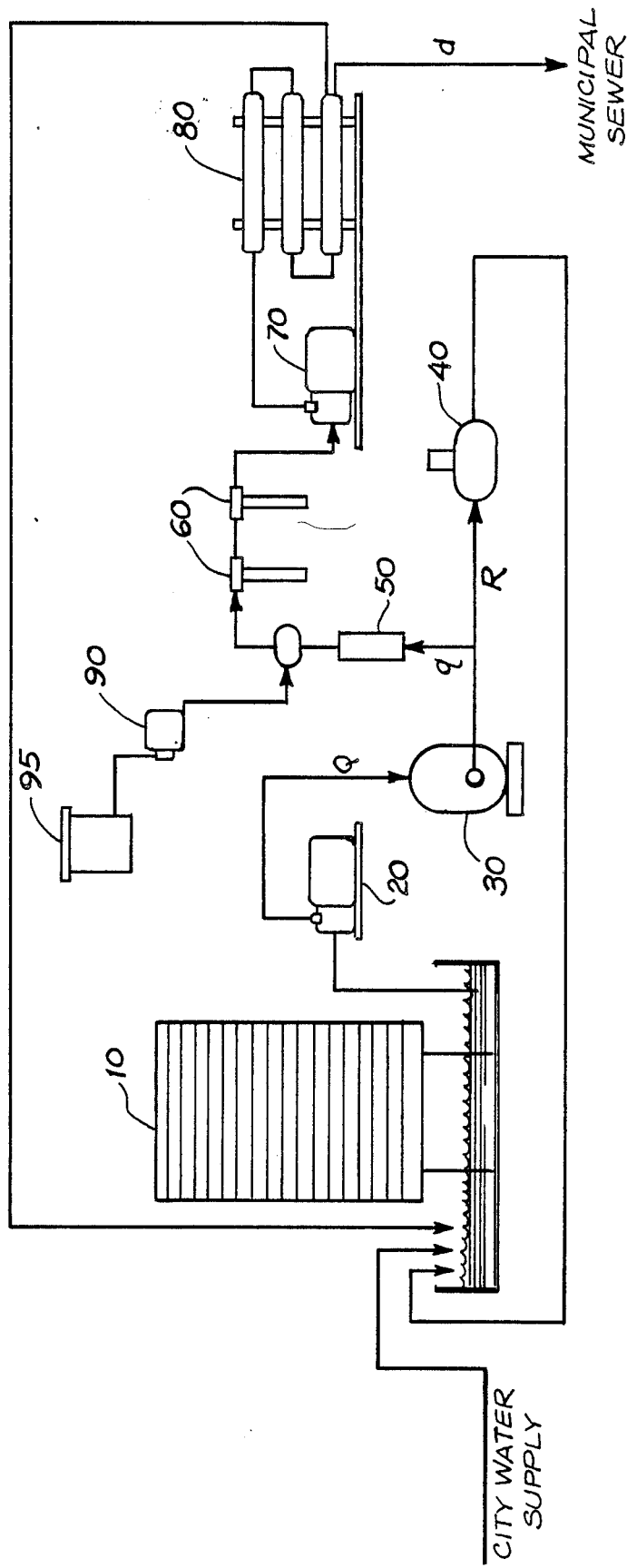
FIG. 1 illustrates a schematic diagram of a cooling tower water purification unit in accordance with the present invention.

The novelty of this invention lies in the fact that a sand filtration unit, a disinfection unit and a nanofiltration unit are used in combination to treat cooling tower water for continuous reuse. Referring to FIG. 1, a cooling tower water recycle circuit is illustrated according to the invention, where a stream of water Q is continuously pumped by a pump 20 through a sand filter 30, and then in large part R through a disinfection unit 40 and returned to the cooling tower 10. The balance of stream Q, a relatively small stream of water q, is removed from this system through the flow controller 50 downstream of the sand filtration stage and passed through a prefiltration stage 60 that in turn feeds a nanofiltration unit 80. A booster pump 70 is in the circuit to provide the appropriate pressure for an efficient operation of the nanofiltration unit. The chemical feed pump 90 delivers small amounts of antiscalent from a storage tank 95 to prevent plugging of the nanofiltration membranes. Finally, the recovery stream r from this unit is recycled to the cooling tower, while the bleeder stream d is discharged to the drain.

Disinfection is required to meet health standards and to avoid the growth of algae. The disinfection stage, though, must be compatible with the use of nanofiltration membranes to reduce TDS. Therefore, while it could theoretically be accomplished by any known means, such as chlorination and ozonization, the process of ionization has proven to be the most advantageous for this invention. Disinfection by chlorine, which is the most common, is not very efficient for this invention because the chlorine tends to combine with the matter it destroys and form particles in the recycled water that react with and plug the nanofiltration membranes. In so doing, they are also filtered out, with the result that additional chlorine must be added routinely.

The preferred embodiment of this invention, therefore, combines an ionization unit with the nanofiltration process because of their special compatibility characteristics. The ionization unit selected must be capable of producing pure ions and avoid build-up of copper or silver in the concentrated water discharged from the nanofiltration system, so that EPA standards for discharge in municipal sewers are met.

The process of water purification by ionization was developed for NASA for space applications. The main purpose was to recycle body wastes and minimize the space required for storing drinking water. Since its original development, the process has been used by airlines, breweries, soft drink bottlers, offshore drilling rigs and resorts. The method is also widely accepted as a standard method of water purification in Europe, but only as an alternative to other purification processes. Although effective, the method has not gained acceptance in the treatment of waste water and toxic chemical effluents.

The ionization process exploits the well known properties of both silver and copper to neutralize bacteria and destroy algae. Therefore, copper and silver ions (or either one alone) are released by a low voltage current flowing through a chamber filled with flowing waste water where copper and silver electrodes are housed. As the electrically charged ions migrate between the electrodes, most of them enter the water stream and remain in solution, circulating until they find and attack bacteria or algae particles. The resulting charged, dead microorganisms mutually attract and form larger particles that are then removed by the filtration system. Very small amounts of ions, in the order of parts per billion to parts per trillion, are sufficient to disinfect the water by eliminating bacteria and algae, and yet they are harmless to human, animal and plant life. Moreover, water purified by ionization is stable and unaffected by sunlight and high temperatures, in contrast to chemically treated waters, which degrade on exposure to both and require periodical addition of chemicals. Chlorine, for example, evaporates rapidly into the air and requires frequent testing of the water for effective level control. Since ions do not evaporate, on the other hand, ionization systems require much less frequent periodical testing and adjustments.

The process of nanofiltration has evolved from experimental work performed to improve the performance of reverse osmosis and of ultrafiltration. See Conlon, W. J. & McClellan, S. M., "Membrane Softening: a Treatment Process Comes of Age," Journal Of AWWA, November 1989, pp.47–51. The term "nano," which refers to a one billionth part, was adopted for this type of filtration because of the size of the pores of the membranes used. Operating at pressures ranging from 75 to 250 psi, these membranes remove particles sizes in the order of angstroms with a rejection rate greater than 95 percent under most conditions. The membranes are available in several chemical compositions with different characteristics for specific applications. Moreover, they can be combined with larger pore membranes (ultrafiltration) and with reverse osmosis membranes to meet the specific requirements of particular waters.

The performance of the process according to this invention is illustrated by the two examples reported below representing very different operating conditions. Both examples deal with the same size cooling tower originally equipped with comparable chemical treatment systems. Each tower was converted to the process covered by the invention using the combination of purification units described herein.

Specifically, the feed pump 20 used in both examples had a capacity of 100 gallons per minute at 90 inch total discharge head. The filtration stage 30 consisted of a 24 inch pressure sand filter, using standard pool filter sand and provided with manual backwash. Of the total flow rate Q, about 10 percent was fed to the nanofiltration unit 80 while it was operating, as determined by the flow controller 50, which continuously monitored the water's TDS by measuring its conductivity. The flow control circuit included a "Cole Palmer" J-5970-36 controller and a J-5970-50 conductivity cell, operating on an on/off mode as a function of predetermined minimum and maximum TDS levels in the water. These levels reflected the water specifications for acceptable quality and non-corrosive behavior. The ionization unit 40 consisted of an "Ion-Tech" copper unit with dual 6 inch flow cells and a standard 50,000 gallon control circuit. The prefiltration unit 60 consisted of two filters in series, of sizes 20 micron and 5 micron, respectively; both filters were dual element "Teel" replaceable cartridges. The booster pump 70 had sufficient capacity to feed the nanofiltration system, which operated at an average pressure of 150 psi. The chemical feed pump 90 was a "Cole Palmer" J-7100-75 and Arco Scientific's filter antiscalent "Flowcon 100" was used. Finally, the three stage nanofiltration system 80 was designed to operate at 80 percent recovery at pressures between 100 and 150 psi with membranes of one angstrom minimum pore size.

EXAMPLE 1

Cooling tower size: 450 tons.
Climate: dry and warm.
Average daily water make-up (evaporation losses): 15,000 gallons.
Make-up water TDS: 775 parts per million.
Make-up water pH: 7.2.
Operating Specifications by Chemical Treatment
Average daily water blowdown: 15,000 gallons.
Operating TDS level: 1,500 parts per million.
Operating Specifications by Treatment according to Invention
Average daily water drainage: 1,940 gallons
operating TDS level: 850 parts per million.
Nanofiltration unit product TDS: 120 parts per million.
Nanofiltration unit reject TDS: 2200 parts per million.
Nanofiltration unit throughput: 9,700 gallons per day.

This system was designed to operate in a very low humidity environment with high evaporation rates and high TDS make-up water. Therefore, low pressure reverse osmosis elements were combined with nanofiltration membranes for higher efficiency. The unit included one "Desal 8 inch SG Series" low pressure reverse osmosis element, one "Desal 4 inch SH Series" nanofiltration element, and one "Desal 2.5 inch SG Series" low pressure reverse osmosis element. The unit was run an average of 9 hours per day.

As shown above, the water consumption by drainage was reduced by about 87 percent, with corresponding make-up water savings. In addition antiscalent consumption was reduced by about 90 percent.

EXAMPLE 2

Cooling tower size: 450 tons.
Climate: humid and cool.
Average daily water make-up (evaporation losses): 8,200 gallons.
Make-up water TDS: 375 parts per million.
Make-up water pH: 7.4.
Operating Specifications by Chemical Treatment
Average daily water blowdown: 5,200 gallons.
Operating TDS level: 1,000 parts per million.
Operating Specifications by Treatment according to Invention
Average daily water drainage: 920 gallons.
Operating TDS level: 450 parts per million.
Nanofiltration unit product TDS: 60 parts per million.
Nanofiltration unit reject TDS: 1200 parts per million.
Nanofiltration unit throughput: 4,600 gallons per day.

This system was designed to operate in a high humidity environment with relatively low evaporation rates and average TDS make-up water. Therefore, low pressure reverse osmosis elements were used for maximum rejection without total ionic removal. The unit included two "Desal 4 inch SG Series" low pressure reverse osmosis elements, and one "Desal 2.5 inch SG Series" low pressure osmosis element. The unit was run an average of 10 hours per day in order to maintain the specifications given above.

The water consumption by drainage was reduced by about 82 percent, with corresponding make-up water savings. In addition, as above, antiscalent consumption was reduced by about 90 percent.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. An apparatus for the purification of waste water, comprising:
    means for providing an alternative to chemical treatment and periodic disposal of cooling water to a sewer system including,
    (a) a sand filtration unit, through which said waste water is passed from a retaining vessel for the removal of relatively larger size particles;
    (b) a disinfection unit, through which most of the effluent from said sand filtration unit is passed for the removal of bacteria and algae;
    (c) a nanofiltration unit, through which the balance of said effluent from said sand filtration unit is passed for the removal of relatively smaller size particles; and
    (d) means for causing said waste water to flow through said units and for recycling the products from said disinfection unit and nanofiltration unit to said retaining vessel.

2. The apparatus described in claim 1, further comprising:
    (e) a prefiltration unit for the removal of intermediate size particles from the feed to said nanofiltration unit.

3. The apparatus described in claim 2, further comprising:
    (f) an additive feed pump for the addition of antiscalent chemicals to prevent scaling and plugging of the membranes in said nanofiltration unit.

4. The apparatus described in claim 3, further comprising:
    (g) an automatic flow controller for sensing the TDS content in the feed to said nanofiltration unit and for regulating the flow of said feed according to desired specifications.

5. An apparatus for the purification of cooling tower water, comprising:
    means for providing an alternative to chemical treatment and periodic disposal of cooling water to a sewer system including,
    (a) a sand filtration unit, through which said water is passed from the cooling tower for the removal of relatively larger size particles;
    (b) a disinfection unit, through which most of the effluent from said sand filtration unit is passed for the removal of bacteria and algae;
    (c) a nanofiltration unit, through which the balance of said effluent from said sand filtration unit is passed for the removal of relatively smaller size particles; and (d) means for causing said water to flow through said units and for recycling the products from said disinfection unit and nanofiltration unit to said cooling tower.

6. The apparatus described in claim 5, further comprising:
(e) a prefiltration unit for the removal of intermediate size particles from the feed to said nanofiltration unit.

7. The apparatus described in claim 6, further comprising:
(f) an additive feed pump for the addition of antiscalent chemicals to prevent scaling and plugging of the membranes in said nanofiltration unit.

8. The apparatus described in claim 7, further comprising:
(g) an automatic flow controller for sensing the TDS content in the feed to said nanofiltration unit and for regulating the flow of said feed according to desired specifications.

9. The apparatus described in claim 8, wherein said disinfection unit consists of an ionization system.

10. The apparatus described in claim 9, wherein said sand filtration unit is designed for removal of particles greater than approximately 50 microns, said prefiltration unit is designed for removal of particles greater than approximately 5 microns, and said nanofiltration unit is designed for removal of particles greater than approximately 5 microns.

11. The apparatus described in claim 10, wherein said flow controller determines the TDS of the water passed through it by measuring its conductivity, automatically interrupts the flow to said nanofiltration unit when said TDS reaches a minimum level below which the water exhibits corrosive properties, and automatically reestablishes said flow to the nanofiltration unit when said TDS reaches a maximum level above the acceptable specifications for the system.

12. The apparatus described in claim 8, wherein said disinfection unit consists of an ozonization system.

13. A method of purifying cooling tower water, comprising the steps of:
providing an alternative to chemical treatment and periodic disposal of cooling tower water to a sewer system by,
(a) passing the water from said cooling tower through a sand filtration unit for the removal of relatively larger size particles;
(b) passing most of the effluent from said sand filtration unit through a disinfection unit for the removal of bacteria and algae;
(c) passing the balance of said effluent from said sand filtration unit through a nanofiltration unit for the removal of relatively smaller size particles; and
(d) recycling the products from said disinfection unit and nanofiltration unit to said cooling tower.

14. The method described in claim 13, further comprising the following step:
(e) passing the feed to said nanofiltration unit through a prefiltration unit for the removal of intermediate size particles.

15. The method described in claim 14, further comprising the following step:
(f) providing an additive feed pump for the addition of antiscalent chemicals to prevent scaling and plugging of the membranes in said nanofiltration unit.

16. The method described in claim 15, further comprising the following step:
(g) providing an automatic flow controller for sensing the TDS content in the feed to said nanofiltration unit and for regulating the flow of said feed according to desired specifications.

17. The method described in claim 16, wherein said disinfection unit consists of an ionization system.

18. The method described in claim 17, wherein said sand filtration unit is desired for removal of particles greater than approximately 50 microns, said prefiltration unit is designed for removal of particles greater than approximately 5 microns, and said nanofiltration unit is designed for removal of particles greater than approximately 5 microns.

19. The method described in claim 18, wherein said flow controller determines the TDS of the water passed through it by measuring its conductivity, automatically interrupts the flow to said nanofiltration unit when said TDS reaches a minimum level below which the water exhibits corrosive properties, and automatically reestablishes said flow to the nanofiltration unit when said TDS reaches a maximum level above the acceptable specifications for the system.

20. The method described in claim 16, wherein said disinfection unit consists of an ozonization system.

* * * * *